United States Patent
Lim

(10) Patent No.: US 8,220,142 B2
(45) Date of Patent: Jul. 17, 2012

(54) METHOD OF FORMING A HOUSING COMPONENT

(75) Inventor: Way Chet Lim, Petaluma, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 12/240,436

(22) Filed: Sep. 29, 2008

(65) Prior Publication Data

US 2009/0091879 A1  Apr. 9, 2009

Related U.S. Application Data

(60) Provisional application No. 60/997,656, filed on Oct. 3, 2007.

(51) Int. Cl.
*H01R 43/00* (2006.01)

(52) U.S. Cl. .............. 29/825; 29/852; 438/8; 438/689; 438/694; 438/696

(58) Field of Classification Search .............. 29/825, 29/852; 438/8, 689, 694, 696
See application file for complete search history.

(56) References Cited

U.S. PATENT DOCUMENTS

| | | | | |
|---|---|---|---|---|
| 5,455,386 A | * | 10/1995 | Brathwaite et al. | 174/529 |
| 7,886,437 B2 | * | 2/2011 | Nashner et al. | 29/852 |
| 2008/0024470 A1 | | 1/2008 | Andre et al. | |
| 2008/0084404 A1 | | 4/2008 | Andre et al. | |
| 2008/0289178 A1 | * | 11/2008 | Nashner et al. | 29/852 |

* cited by examiner

*Primary Examiner* — Carl Arbes
(74) *Attorney, Agent, or Firm* — Kramer Levin Naftalis & Frankel LLP

(57) ABSTRACT

Electronic devices are provided with housing components that have improved aesthetics. One or more holes may be formed through a portion of the housing and then the housing portion may be anodized. The anodization process may increase or decrease the geometries of each hole. The holes may be formed through the housing portion from a cosmetic side of the housing portion to an interior side of the housing portion.

20 Claims, 6 Drawing Sheets

US 8,220,142 B2

METHOD OF FORMING A HOUSING COMPONENT

CROSS-REFERENCE TO RELATED APPLICATION

This claims the benefit of U.S. Provisional Application No. 60/997,656, filed Oct. 3, 2007, which is hereby incorporated by reference herein in its entirety.

FIELD OF THE INVENTION

This relates to methods and apparatus for providing holes through housing components of electronic devices.

BACKGROUND OF THE DISCLOSURE

Some known electronic devices (e.g., computers and telephones) include at least one internal electronic component associated with the operation of the device and a protective housing that at least partially encloses the one or more internal electronic components. Typically, the housing includes one or more housing components that serve to surround the internal electronic components at a peripheral region of the electronic device so as to cover and protect the internal components from adverse conditions. Also, one or more holes may be provided through one or more of the housing components. Information transmitted from and/or received by the internal electronic components may be passed through the one or more holes provided through the housing component of the electronic device.

Cosmetic features are important to consumers of electronic devices, as these features help create the overall impression that one has of the electronic device. Therefore, the housing and the holes provided through the housing may also be configured to form and aesthetically enhance the outward appearance of the electronic device. For example, the shape, contours, and/or color of the housing and/or the holes provided through the housing may be designed so as to create a positive impression about the electronic device, thereby contributing to the overall success of the device in the market place.

Accordingly, what is needed are apparatus and methods for providing holes through housing components of various electronic devices.

SUMMARY OF THE DISCLOSURE

Apparatus and methods for providing holes through housing components of various electronic devices are provided.

According to one embodiment of the invention, there is provided a method of forming a housing component for an electronic device. The method may include providing a piece of material for creating a portion of the housing component, forming at least one hole through the piece of material, and then anodizing the piece of material.

According to another embodiment of the invention, there is provided a method of forming a housing component for an electronic device. The method may include providing a piece of material with an inner surface and an outer surface for creating a portion of the housing component, forming at least one hole through the piece of material between the inner surface and the outer surface, and anodizing the piece of material, wherein the anodizing changes the size of the at least one hole.

According to another embodiment of the invention, there is provided an electronic device that includes a housing component. The housing component may include an anodized piece of material with an inner surface, an outer surface, and at least one hole through the anodized piece of material between the inner surface and the outer surface. An anodization layer may cover at least a portion of the piece of material within the at least one hole.

BRIEF DESCRIPTION OF THE DRAWINGS

The above and other aspects of the invention, its nature, and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Apparatus and methods are provided for providing holes through housing components of various electronic devices. The invention will now be described with reference to FIGS. 1-6.

FIGS. 1-4 show an embodiment of an electronic device 100 including at least one housing component constructed in accordance with the invention. The term "electronic device" can include, but is not limited to, music players, video players, still image players, game players, other media players, music recorders, video recorders, cameras, other media recorders, radios, medical equipment, domestic appliances, transportation vehicle instruments, calculators, cellular telephones, other wireless communication devices, personal digital assistants, programmable remote controls, pagers, laptop computers, desktop computers, printers, and combinations thereof. In some cases, the electronic device may perform a single function (e.g., a device dedicated to playing music) and, in other cases, the electronic device may perform multiple functions (e.g., a device that plays music, displays video, stores pictures, and receives and transmits telephone calls).

Moreover, in some cases, the electronic device may be any portable, mobile, hand-held, or miniature electronic device having at least one housing component constructed in accordance with the invention so as to allow a user to use the device wherever the user travels. A miniature electronic device may have a form factor that is smaller than that of hand-held electronic devices, such as an iPod™ available by Apple Inc. of Cupertino, Calif. An illustrative miniature electronic device can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, and combinations thereof. Alternatively, an electronic device that includes at least one housing component of the invention may not be portable at all, but may instead be generally stationary, such as a television or a desktop computer (e.g., an iMac™ available by Apple Inc.).

Figure 1:
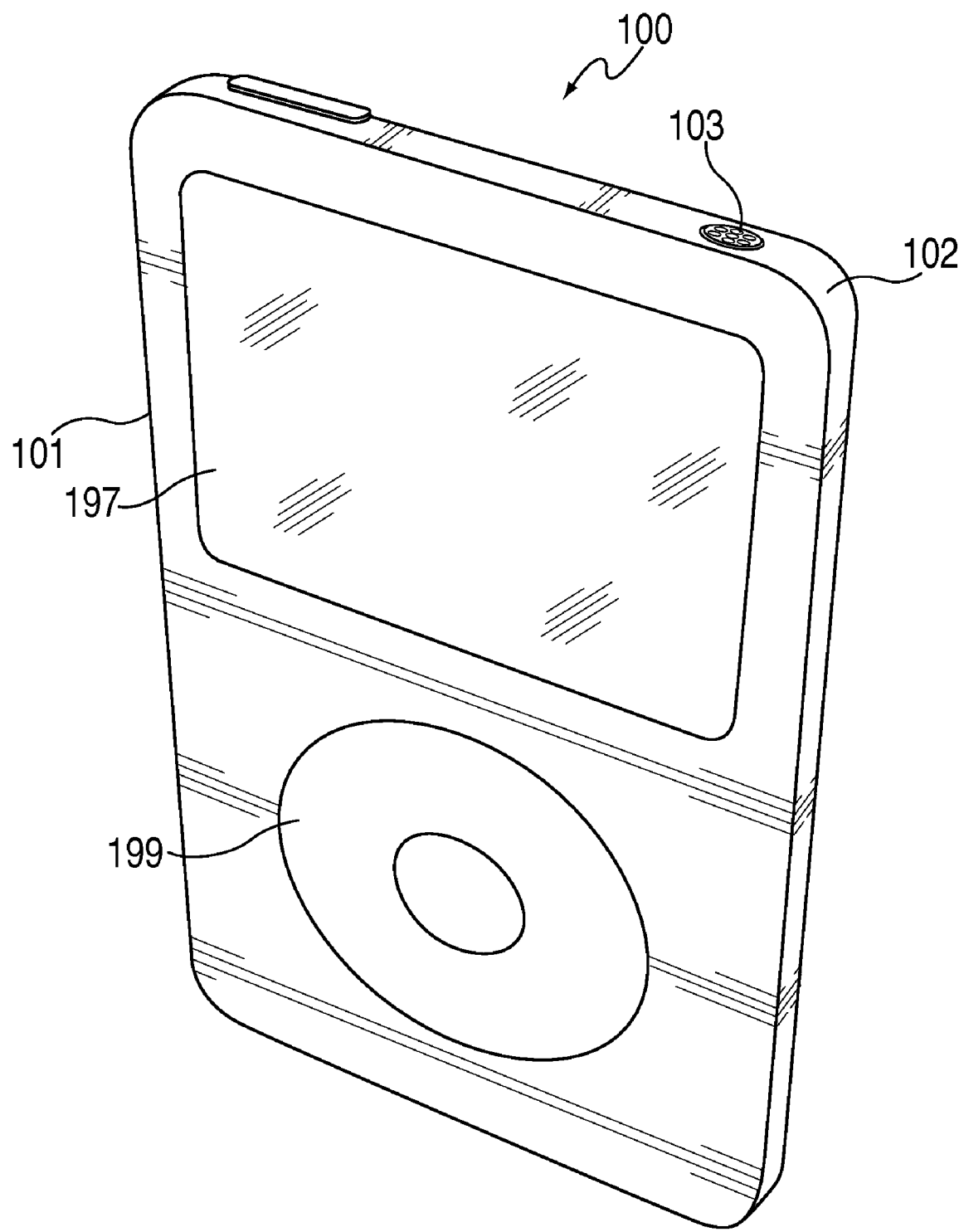
FIG. 1 is a top, front, right perspective view of an electronic device in accordance with some embodiments of the invention.

Electronic device 100 can include at least one electronic component (e.g., a processor, memory region, display component, transmitter, receiver, etc.) and a protective housing (e.g., housing 101) that at least partially encloses the one or more electronic components of the device. As shown in FIG. 1, for example, housing 101 of device 100 may at least partially enclose a device output component 197 (e.g., a video display screen) and a user input component 199 (e.g., a scroll wheel). Moreover, as shown in FIG. 1, housing 101 can be hexahedral. Although, it should be noted that housing 101 of device 100 is only exemplary and need not be substantially hexahedral, and that, in some embodiments, the housing of device 100 can generally be formed in any other suitable shape, including, but not limited to, substantially spherical, ellipsoidal, conoidal, octahedral, or a combination thereof, for example.

In some embodiments, housing 101 may include at least one housing component formed from metal. The metal housing component may be configured to make the electronic device look as if the electronic device was formed from a single block of metal (i.e., a solid piece of metal that has been hollowed out).

In other embodiments, however, housing 101 may not be formed from a block of material, as the cost of doing this can be quite expensive. That is, although the housing component may look as though it was machined to give it its net shape from a single block of material, it may in fact be formed by other processes designed to mimic the machined look.

In some embodiments, a metal housing component that looks like it was formed from a block of material may be formed rather from a piece of sheet of metal (e.g., flat stock). That is, the sheet metal may be formed in such a way that the final part looks like it was machined down from a large thick slab of material. By utilizing sheet metal, the overall cost of the part can be reduced (e.g., it is very expensive to machine down a large piece of metal as it wastes a lot of material and time).

In some embodiments, the shape of the housing component may be at least partially created by drawing and, more particularly, by deep drawing portions of the sheet of metal. Additionally or alternatively, the shape of the housing component may be at least partially created by forging portions of the sheet of metal. Additionally or alternatively, the shape of the housing component may be at least partially created by machining portions of the sheet of metal. For example, a sheet of metal may be deep drawn to form a housing component with a front wall and side walls extending therefrom (e.g., to form a box or can with one open end). The housing component may be configured with a front wall and top, right side, left side, and bottom walls at the peripheral edge portions of the front wall. The front wall as well as the other walls may include various openings for devices associated with the electronic device. For example, the front wall may include an opening for a display of the electronic device (e.g., device output component 197). Thereafter, portions of the housing component may be forged to affect its geometry at specific locations (e.g., to change the shape and/or thickness of the material at specific locations). Thereafter, portions of the housing component may be machined to form a near net shape.

One or more small holes may be provided at least partially through at least a portion of at least one housing component according to the invention. For example, in some embodiments, such holes may provide passageways for information to be communicated through the housing to and/or from one or more electronic components of the device (e.g., an input/output ("I/O") interface component). The I/O component may be positioned adjacent the inner surface of the housing component under one or more of the small holes, thereby creating an I/O interface.

Any portion of any housing component may include one or more holes formed therethrough for providing an I/O ("input/output") interface, such as that described in Andre et al., U.S. Published Patent Application No. 2008/0084404, published Apr. 10, 2008, and Andre et al., U.S. Published Patent Application No. 2008/0024470, published Jan. 31, 2008, each of which is hereby incorporated by reference herein in its entirety.

For example, as shown in FIGS. 1-4, one or more holes 150 may be provided through a portion 103 of a housing component (e.g., a top wall) of housing 101. It is to be understood that housing component portion 103 may be any portion of any housing component of any electronic device in accordance with the invention.

Each hole 150 may be provided between a "cosmetic" or outer surface 102 and an opposite or "internal" or inner surface 104 of portion 103 of housing 101. Two or more holes 150 may form a collection or pattern 158 of neighboring holes 150 on outer surface 102 of portion 103. Each hole 150 may be defined by an outer opening 152 in outer surface 102, an inner opening 154 in inner surface 104, and a hollow passageway 156 extending therebetween.

Portion 103 of housing 101 may be made of any suitable material that may retain the structural integrity of the housing component, including, for example, metal (e.g., 6063 aluminum) and plastic. Portion 103 of the housing component may be provided with an overall thickness T (see, e.g., FIG. 3). In some embodiments, thickness T may be in the range of 0.5 millimeters to 5.5 millimeters. In some embodiments, thickness T may be in the range of 1.5 millimeters to 4.5 millimeters. In some embodiments, thickness T may be in the range of 2.5 millimeters to 3.5 millimeters. In some embodiments, thickness T may be about 3.0 millimeters. In other embodiments, thickness T may be in the range of 0.25 millimeters to 0.75 millimeters. In some embodiments, thickness T may be in the range of 0.35 millimeters to 0.65 millimeters. In some embodiments, thickness T may be in the range of 0.45 millimeters to 0.55 millimeters. In some embodiments, thickness T may be about 0.49 millimeters.

Figure 3:
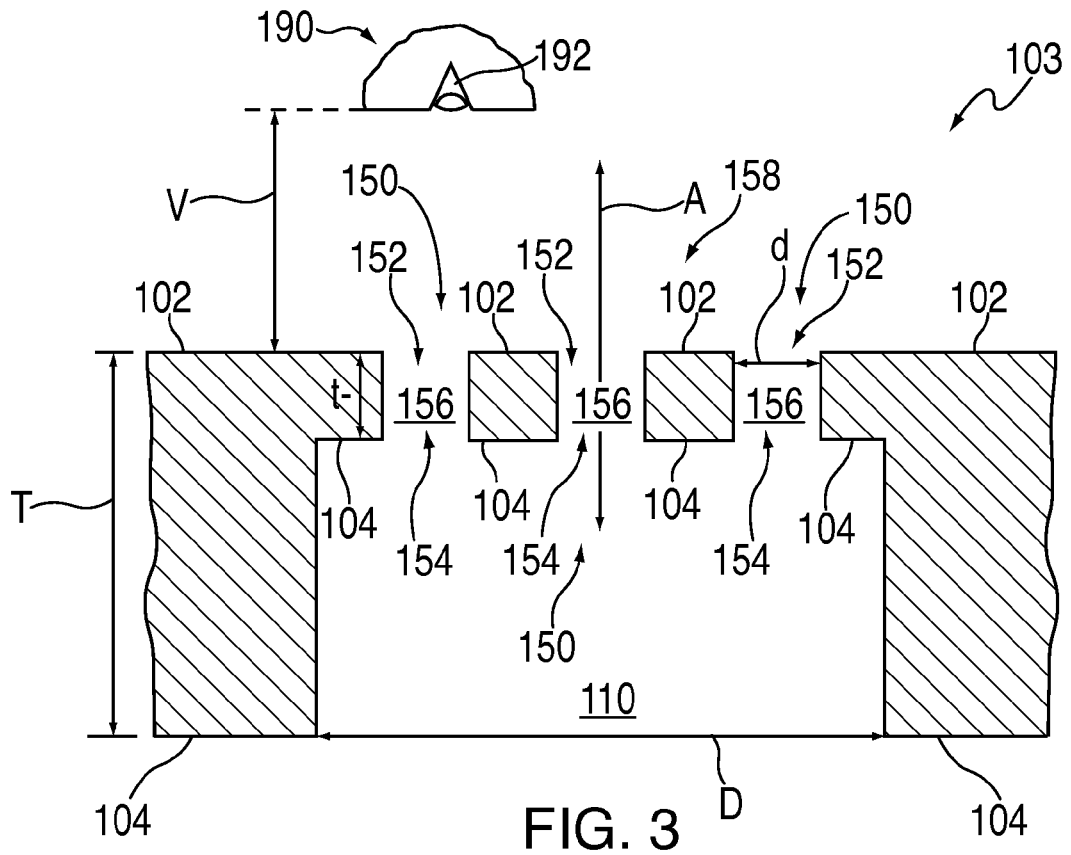
FIG. 3 is a cross-sectional view of a portion of the electronic device of FIGS. 1 and 2, taken from line III-III of FIG. 2.

However, in some embodiments, a cavity 110 may be formed into inner surface 104 of portion 103 at the location where inner openings 154 of holes 150 are to be provided. Cavity 110 may be formed by any suitable process, such as laser ablating, for example. As shown in FIG. 3, for example, cavity 110 may reduce the thickness of portion 103 of housing 101 to a reduced thickness t at the location where inner openings 154 of holes 150 are to be provided. In some embodiments, reduced thickness t may be in the range of 0.2 millimeters to 0.8 millimeters. In some embodiments, reduced thickness t may be in the range of 0.3 millimeters to 0.7 millimeters. In some embodiments, reduced thickness t may be in the range of 0.4 millimeters to 0.6 millimeters. In some embodiments, reduced thickness t may be about 0.5 millimeters. In other embodiments, reduced thickness t may be in the range of 0.05 millimeters to 0.45 millimeters. In some embodiments, reduced thickness t may be in the range of 0.15 millimeters to 0.35 millimeters. In some embodiments, reduced thickness t may be about 0.25 millimeters.

The formation of cavity 110 may facilitate the formation of holes 150 by reducing the thickness of portion 103 from thickness T to reduced thickness t at the location where inner openings 154 of holes 150 are to be provided, and thereby reducing the amount of material of portion 103 to be excavated during the process of creating holes 150. However, it is to be understood that, in certain embodiments, the formation of cavity 110 may not appreciably improve the overall efficiency or speed of manufacturing holes 150 through portion 103. For example, when thickness T of portion 103 is not particularly thick, the additional time and effort required to manufacture holes 150 may be less than the additional time and effort required to first form cavity 110. In such a case, it may be more efficient and economical to omit the cost and delay associated with forming cavity 110 before creating holes 150.

Figure 4:
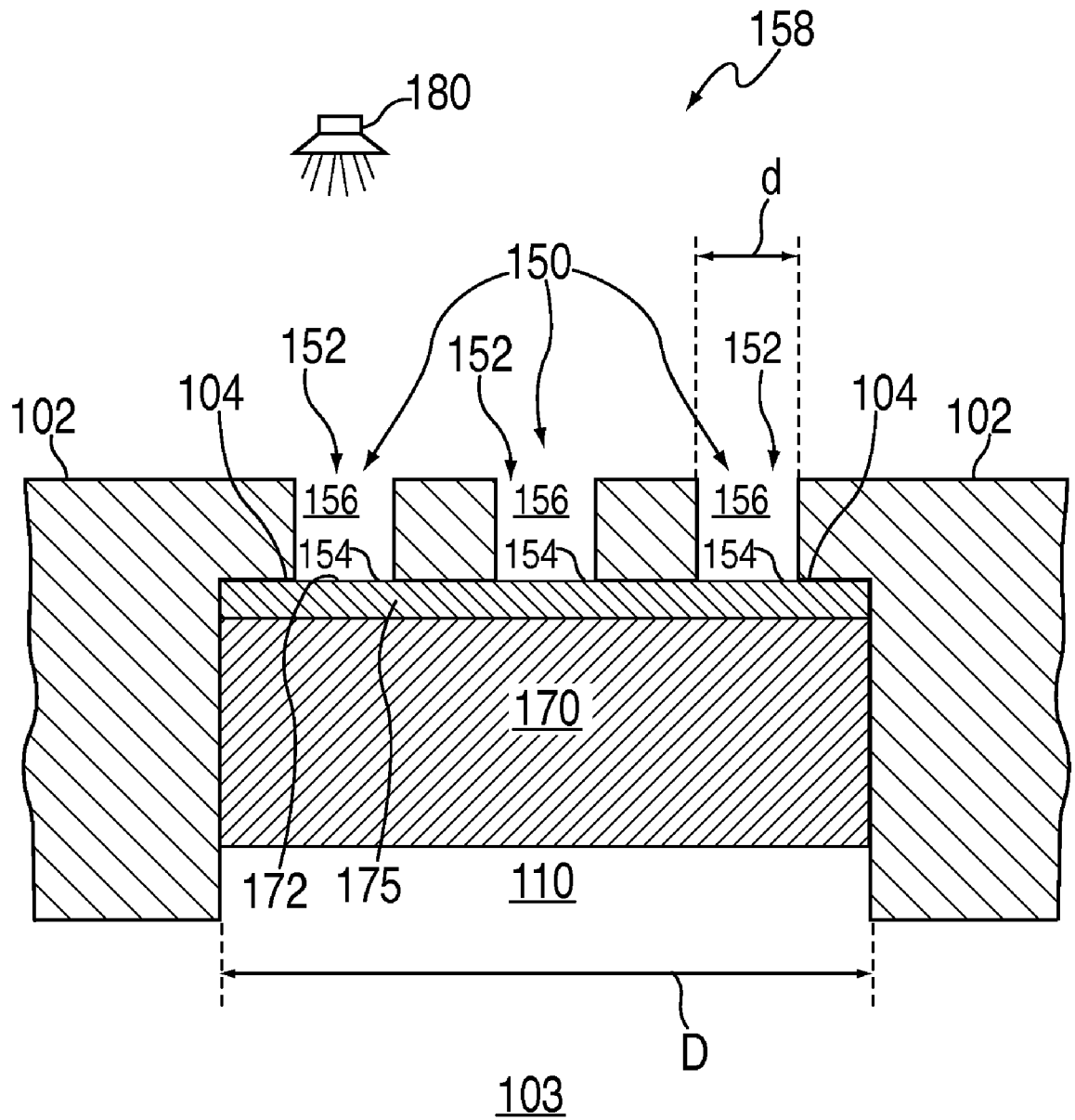
FIG. 4 is a cross-sectional view of a portion of the electronic device of FIGS. 1-3, similar to FIG. 3, but with an additional component in accordance with some embodiments of the invention.

An input/output ("I/O") interface component may be provided adjacent the inner surface of the housing component under one or more holes provided therein for creating an I/O interface. As shown in FIG. 4, for example, an I/O component 170 may be provided adjacent inner surface 104 of portion 103. In one embodiment, I/O component 170 may be positioned such that an outer surface 172 of I/O component 170 faces an inner opening 154 of one or more holes 150 in portion 103. If portion 103 includes a cavity 110, cavity 110 may be sized such that I/O component 170 fits therein.

I/O component 170 may be any component suitable for transmitting and/or receiving information through one or more holes 150 proximal thereto. A minimum aspect ratio of the total cross-sectional area of the openings of holes 150 formed through portion 103 with respect to the total cross-sectional area or surface area of the active portion of I/O component 170 may be carefully designed to meet the performance specifications of that particular I/O component.

For example, in one embodiment, I/O component 170 may be a microphone that is capable of receiving sound waves transmitted from a source external to the housing component (e.g., external source 180) through one or more holes 150. The minimum aspect ratio of the combined total cross-sectional area of outer openings 152 and/or of inner openings 154 of holes 150 with respect to the total surface area of the active portion of microphone I/O component 170 (e.g., the total surface area of the transducer or sensor used to receive sound waves) may be chosen to meet specific performance requirements of microphone 170. In some embodiments, this minimum aspect ratio may be in the range of 10% to 30%. In some embodiments, this minimum aspect ratio may be in the range of 15% to 25%. In some embodiments, this minimum aspect ratio may be about 18.4%.

As shown in FIG. 4, for example, microphone I/O component 170 may include an active portion 175 that spans all of outer surface 172. Moreover, as shown in FIG. 4, active portion 175 and outer surface 172 of I/O component 170 may also span all of inner surface 104 of portion 103 defined by cavity 110. In this embodiment, in which holes 150 may be utilized to pass sound waves from external source 180 to I/O component 170 configured as a microphone, each hole 150 may be provided with a circular outer opening 152 having a diameter d (see, e.g., FIGS. 2-4), for example. Moreover, cavity 110 may be formed within portion 103 as a cylinder having a diameter D (see, e.g., FIGS. 2-4) and, therefore, active portion 175 of microphone 170 may also be cylindrical with a diameter D.

In this particular illustrative embodiment, seven equally shaped holes 150 are provided through portion 103 as a pattern 158. Therefore, in order to meet specific performance specifications of microphone 170, the combined cross-sectional area of all seven holes 150 in pattern 158 must be at least a specifically chosen percentage of the surface area of active portion 175 (i.e., have a specifically chosen aspect ratio). For example, in one embodiment, if diameter D of active portion 175 is 1.5 millimeters and if the minimum required aspect ratio of microphone 170 is 18.4%, each of the seven holes 150 of pattern 158 may be formed with an outer opening 152 having a diameter d equal to about 0.25 millimeters.

It is to be understood, that the foregoing is just illustrative, and that active I/O component active portion 175, cavity 110, pattern 158, and each one of holes 150 and its openings 152 and 154 may be formed of any suitable size and shape, including, but not limited to, triangular, rectangular, elliptical, etc. Moreover, pattern 158 may be formed of any suitable number of holes 150, including just one hole, for example. Each hole 150 in pattern 158 may be separated from other holes 150 in pattern 158 by any suitable distance, depending on the size of pattern 158 and the function of holes 150 with respect to an associated I/O component 170.

For example, in another embodiment, I/O component 170 may include one or more light sources capable of transmitting light through one or more holes 150 towards a user or other entity external to the housing component (e.g., viewer 190 of FIG. 3). Alternatively, I/O component 170 may include one or more receptors that may be sensitive to visible light received through one or more holes 150 from an entity external to the housing component for providing ambient light sensing ("ALS"), for example. I/O component 170 may include one or more receptors that may be sensitive to infra-red light ("IR") received through one or more holes 150 from an entity external to the housing component for receiving IR control signals from a remote control transmitter, for example. I/O component 170 may also be configured as an antenna, a proximity detector, a motion detector, or any other suitable I/O device that may transmit and/or receive information via one or more holes 150.

In some embodiments, one or more holes 150 may be formed by creating a hollow passageway in portion 103 between an outer opening in outer surface 102 and an inner opening in inner surface 104 such that substantially all sides of the passageway are parallel with one another. Moreover, the sides of the passageway may also be parallel with an axis that is substantially perpendicular to outer surface 102 and substantially in the center of pattern 158. For example, as shown in FIGS. 2 and 3, the walls of each of hollow passageways 156 in portion 103 between an outer opening 152 in outer surface 102 and an inner opening 154 in inner surface 104 may be substantially parallel with an axis A that is substantially perpendicular to outer surface 102 and that may be substantially in the center of pattern 158.

Figure 3A:
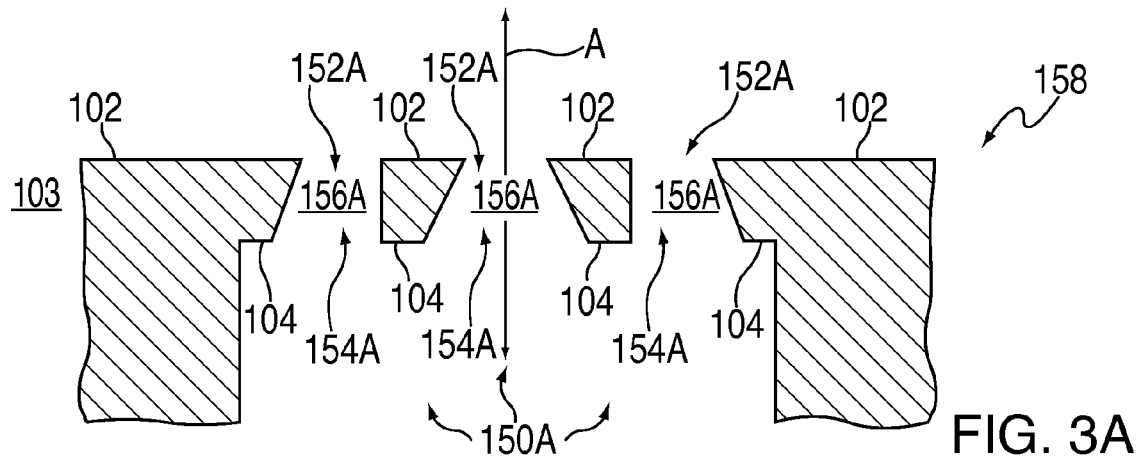
FIG. 3A is a cross-sectional view, similar to FIG. 3, of a portion of an electronic device in accordance with other embodiments of the invention.
Figure 3B:
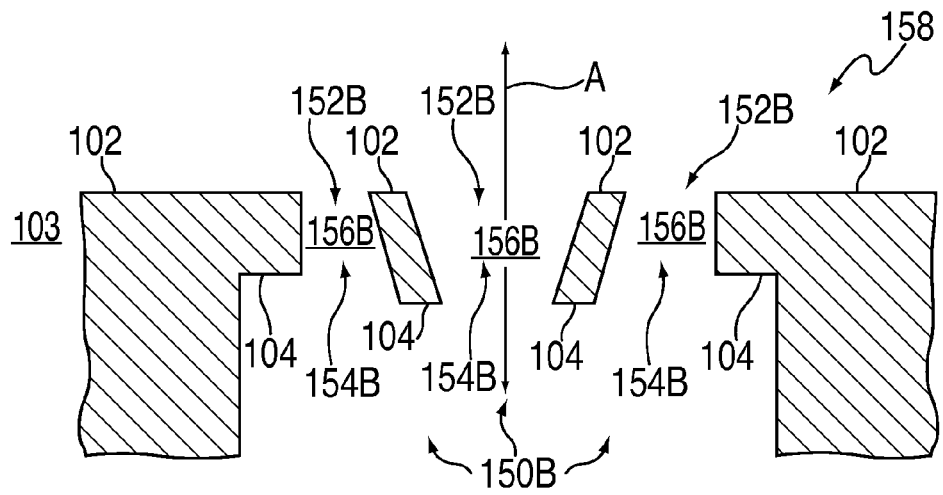
FIG. 3B is a cross-sectional view, similar to FIGS. 3 and 3A, of a portion of an electronic device in accordance with yet other embodiments of the invention.

In other embodiments, one or more holes may be formed by creating a tapered hollow passageway in portion 103 between outer surface 102 and inner surface 104 such that one or more side portions of the passageway are angled with respect to each other. Moreover, one or more side portions of the passageway may be angled with respect to an axis that is substantially perpendicular to outer surface 102. For example, as shown in FIG. 3A, at least one of the walls of each of hollow passageways 156A in portion 103 between an outer opening 152A in outer surface 102A and an inner opening 154A in inner surface 104A may be angled towards axis A (i.e., "angled inwardly"). As shown in FIG. 3B, for example, at least one of the walls of each of hollow passageways 156B in portion 103 between an outer opening 152B in outer surface 102B and an inner opening 154B in inner surface 104B may be angled away from axis A (i.e., "angled outwardly").

Figure 3C:
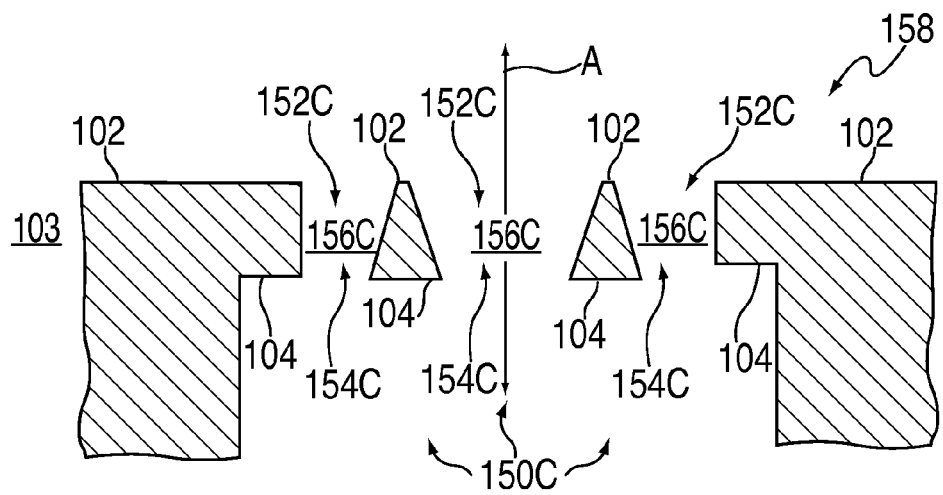
FIG. 3C is a cross-sectional view, similar to FIGS. 3-3B, of a portion of an electronic device in accordance with yet still other embodiments of the invention.

As shown in FIG. 3A, for example, each of holes 150A may be tapered such that the aspect ratio of the cross-sectional area of outer opening 152A to the cross-sectional area of inner opening 154A is less than 1 (i.e., the size of outer opening 152A is less than the size of inner opening 154A). In some embodiments, this aspect ratio may be in the range of 1:6 to 1:2. In some embodiments, this aspect ratio is about 1:3. However, in other embodiments, as shown in FIG. 3C, for example, each of holes 150C may be tapered such that the aspect ratio of the cross-sectional area of outer opening 152C to the cross-sectional area of inner opening 154C is greater than 1 (i.e., the size of outer opening 152C is greater than the size of inner opening 154C). In some embodiments, this aspect ratio may be in the range of 6:1 to 2:1. In some embodiments, this aspect ratio is about 3:1. The angle and aspect ratio of each hole 150 may be varied according to its particular application for providing an I/O interface.

Figure 2:
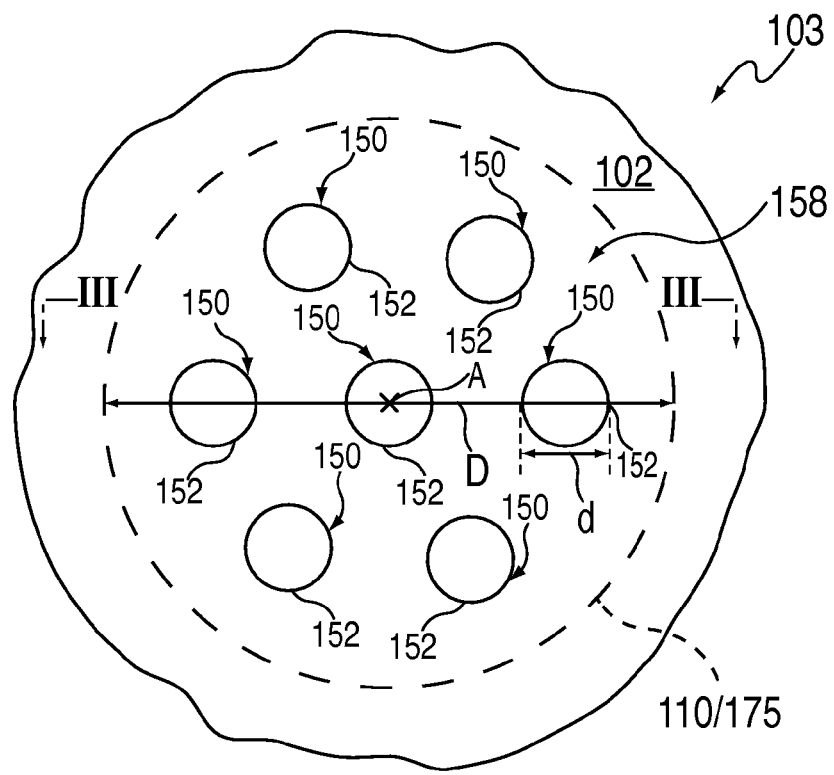
FIG. 2 is a top elevational view of a portion of the electronic device of FIG. 1.

Although shown greatly enlarged in FIGS. 2-4, one or more of holes 150 may be imperceptible or invisible to the unaided human eye. That is, the cross-sectional area of outer opening 152 of one or more holes 150 may be too small to be resolvable by a user looking at outer surface 102 of portion 103. The average limit of resolution for the unaided adult human eye is about 0.10 millimeters at a viewing distance of about 1 meter. For children, the average limit of resolution is somewhat finer (e.g., 0.04 millimeters at a viewing distance of about 1 meter). Therefore, depending on the anticipated viewer 190 and the anticipated viewing distance V between his or her eye 192 and outer surface 102 of portion 103, the cross-sectional area of outer opening 152 of one or more holes 150 may be selected to be below the limit of resolution of user 190, thereby being imperceptible or invisible to user's eye 192 (see, e.g., FIG. 3).

Thus, as defined herein, the term "invisible hole" may refer to any hole with an outer opening that is smaller than what may be resolvable by an unaided human eye at an anticipated viewing distance. Conversely, it is to be understood that the term "visible hole," as defined herein, may refer to any hole with an outer opening that is large enough to be resolvable by an unaided human eye at an anticipated viewing distance.

Each hole 150 may be formed through portion 103 of housing 101 using one or more suitable techniques, including, but not limited to, laser drilling, laser cutting, laser machining, laser ablating, electron beam machining, electro-discharge machining ("EDM"), chemical milling, metal injection molding, conventional drilling, and combinations thereof. The one or more techniques used may depend on the size and shape of the desired hole 150 and the size and material of portion 103, for example. In some embodiments, an ultra-violet ("UV") computer numerical controlled ("CNC") laser tool having a 1,000 picometer wavelength laser beam with a focal width (i.e., spot size) of about 0.015 millimeters may be used to form one or more holes 150 in portion 103. In other embodiments, a green or yttrium-aluminium-garnet ("YAG") laser may be used, for example, when forming holes with a larger cross-sectional area (e.g., holes with a diameter or cross-sectional length of 0.045 millimeters or greater).

A tapered hole (e.g., holes 150A, 150B, or 150C) may be formed by a type of trepanning process, wherein the orbit of a laser may tighten or expand as the laser drills deeper into portion 103, for example. A hole 150 may be formed by percussively excavating an entire passageway (e.g., passageway 156) through portion 103. Alternatively, a hole 150 may be formed by excavating the section of portion 103 about the passageway, between the perimeters of the openings defining the hole (e.g., the section of portion 103 about passageway 156, between the perimeters of openings 152 and 154, in the shape of a hollow cylinder). Then, the remaining material of portion 103 that has been isolated by this excavation may be pushed out of the remainder of portion 103 (e.g., by a jet stream of air), thereby leaving a hole 150. An additional drilling step may then be performed within passageway 156 (e.g., by trepanning) to smooth the inner surface of hole 150.

The formation of holes 150 using the methods described above may tend to create burrs, roughness, and other indentations and deformations on the surface of the housing portion through which the excavation or removal of material begins. Therefore, holes 150 have conventionally been formed by initiating removal of the housing material from the "internal" or inner surface 104 of portion 103 that is opposite "cosmetic" or outer surface 102. This may help to reduce the amount of burrs and rough edges created on the cosmetic side of the housing. However, it may be desirable to form holes 150 by initiating removal of the housing material from the "cosmetic" or outer surface 102 while minimizing the amount of burrs and rough edges on the cosmetic surface 102 created by such a formation process.

Figure 5A:
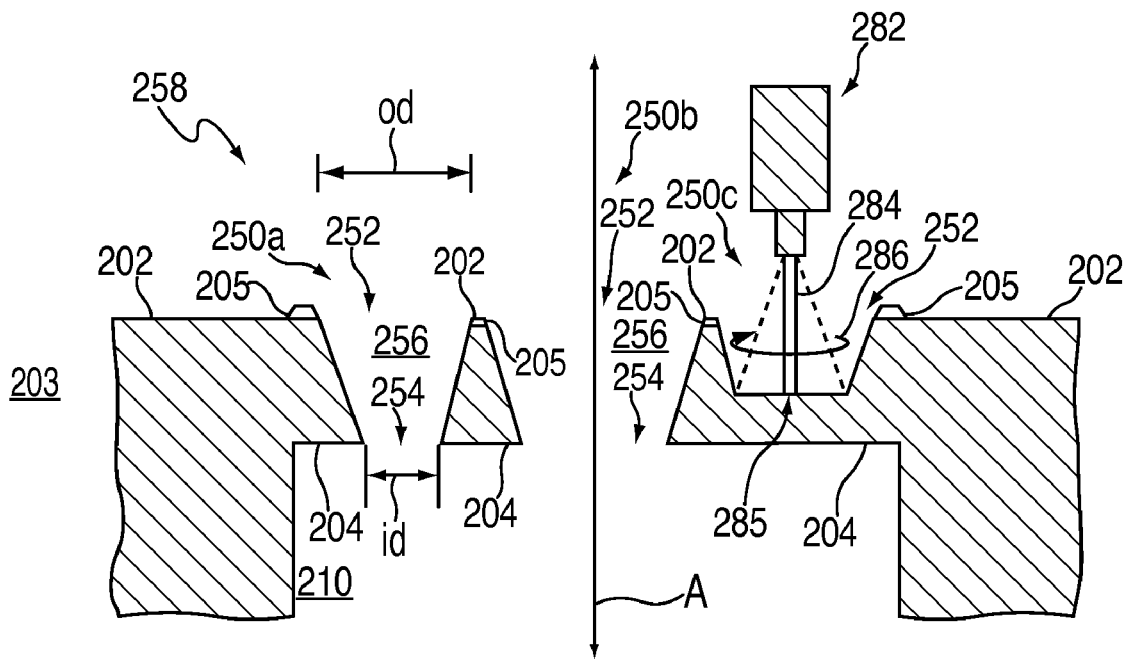
FIG. 5A is a cross-sectional view of a portion of an electronic device, similar to FIGS. 3 and 4, after a first step in a creation process in accordance with some embodiments of the invention.

In accordance with some embodiments of the invention, one or more holes may be created through a portion of a housing component of an electronic device using one or more suitable techniques, including, but not limited to, laser drilling, laser cutting, laser machining, laser ablating, electron beam machining, electro-discharge machining ("EDM"), chemical milling, metal injection molding, conventional drilling, and combinations thereof, by initiating the creation of each hole from the cosmetic side of the housing portion. For example, as shown in FIG. 5A, one or more holes 250 may be provided through a portion 203 of a housing of an electronic device according to some embodiments of the invention. Each hole 250 may be provided between a cosmetic or outer surface 202 and an opposite or inner surface 204 of portion 203. Each hole 250 may be defined by an outer opening 252 in outer surface 202, an inner opening 254 in inner surface 204, and a hollow passageway 256 extending therebetween. The formation of holes 250 is shown in FIG. 5A in the early stages thereof, with two holes 250a and 250b formed, and laser drilling of a third hole 250c having just begun.

As shown, formation of holes 250 may be performed from outer surface 202 using a laser 282. Laser 282 may have a laser beam 284 with a focal width 285. For example, laser 282 may be an ultra-violet ("UV") computer numerical controlled ("CNC") laser tool having a 1,000 picometer wavelength laser beam 284 with a focal width 285 (i.e., spot size) of about 0.015 millimeters.

As shown in FIG. 5A, for example, in order to achieve a "tapered" or gradual narrowing geometry for each hole 250, laser beam 284 may be configured with a focal width 285 that is no larger, and preferably less, than the smallest diameter of the tapered hole that is to be formed. For example, if inner opening 254 of hole 250 through inner surface 204 is to be formed with an inner diameter id, focal width 285 may be no larger than id. In one embodiment, id may be 0.025 millimeters. Therefore, focal width 285 may be no larger than 0.025 millimeters. In other embodiments, focal width 285 may be no larger than half the size of the smallest diameter (e.g., no larger than 0.0125 millimeters).

Once focal width 285 is selected, laser beam 284 may be initially orbited around the edges of hole 250, as illustrated with respect to hole 250*c*, where the dotted lines embraced within the arrow indicate orbit 286 of laser beam 284. The orbiting of laser beam 284 may be initiated by describing the initial opening in the housing portion (e.g., outer opening 252 in cosmetic outer surface 202). For example, if outer opening 252 of hole 250 through outer surface 202 is to be formed with an outer diameter od, orbit 286 may initially enter surface 202 with a diameter od. In some embodiments, od may be about 0.075 millimeters. Therefore, orbit 286 may initially enter surface 202 with a diameter of about 0.075 millimeters. As hole 250 forms and deepens (e.g., in the downward direction along axis A), orbit 286 of laser beam 284 may correspondingly tighten to progressively reduce the diameter of orbit 286, and thus reduce the diameter of hole 250. At the conclusion of the hole formation at inner surface 204, in some embodiments, orbit 286 may have been progressively and continuously reduced until it is only about 0.050 millimeters, which may still be larger than focal width 285 of about 0.025 millimeters, for example. In other embodiments, the diameter of orbit 286 may be maintained as beam 284 forms and deepens hole 250, such that substantially all sides of the passageway are parallel with one another (see, e.g., holes 150 of FIG. 3). Alternatively, the diameter of orbit 286 may be increased as beam 284 forms and deepens hole 250, such that one or more side portions of the passageway are angled away from axis A, such that diameter id of inner opening 254 may be greater than diameter od of outer opening 252 (not shown).

As mentioned, this process of forming holes may create burrs, rough edges, and various other types of indentations and deformations on the surface of the housing portion through which the excavation begins. For example, as shown in FIG. 5A, deformations 205 may be formed on cosmetic or outer surface 202 of housing portion 203. Conventionally, an electronic device housing, such as a housing made of aluminum, for example, may be anodized before forming holes therethrough. However, according to some embodiments of the invention, the material of housing portion 203 may be anodized after the formation of holes 250 for reducing or eliminating deformations 205.

Figure 6:
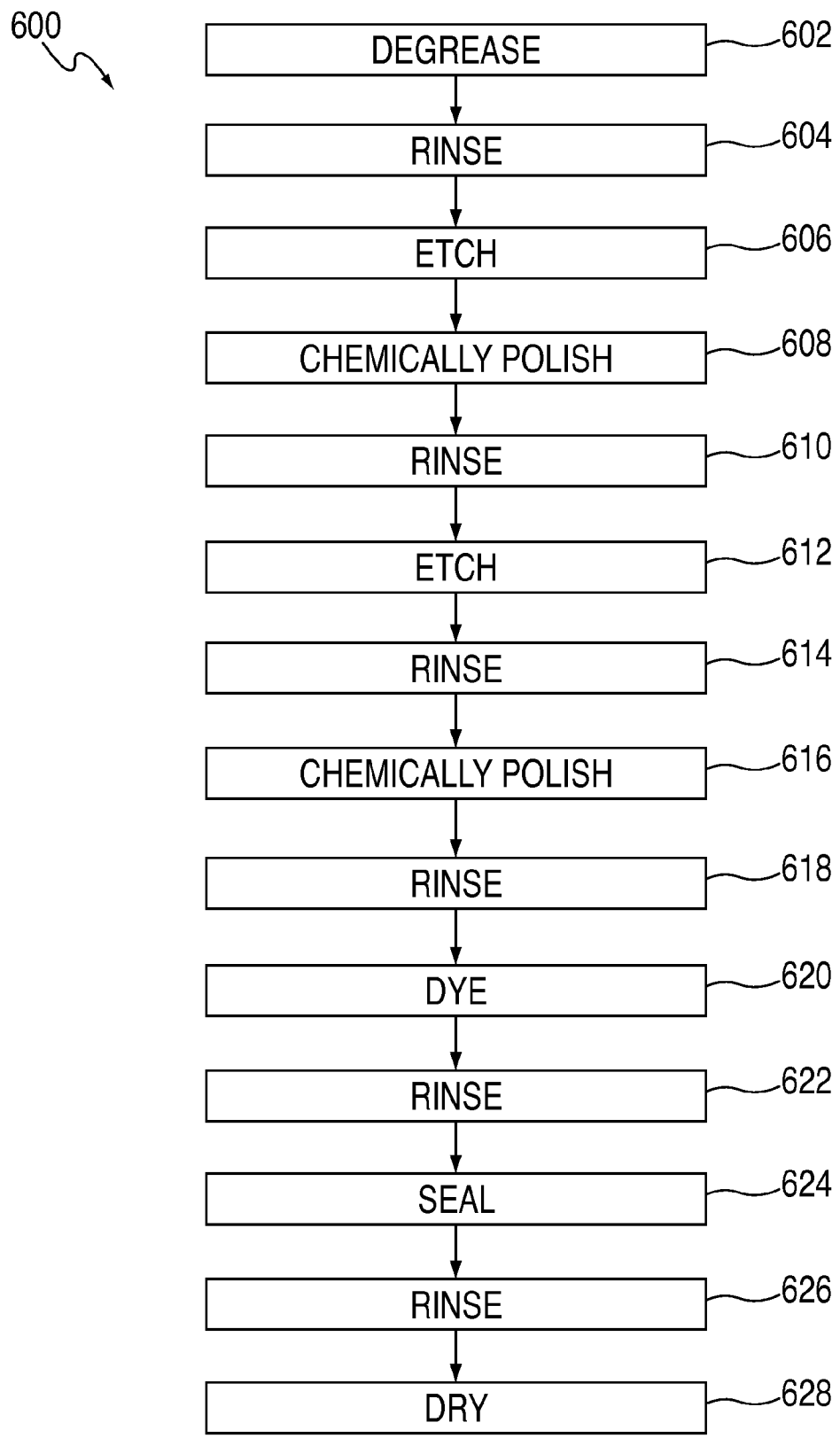
FIG. 6 is a flowchart of an anodization process in accordance with some embodiments of the invention.

Anodization is an electrolytic process for aluminum and its alloys to produce a protective layer through electro-chemical oxidation. Among other things, anodization may serve the function of corrosion resistance, scratch and wear resistance, electrical insulation, cleanliness, and aesthetic enhancement. For example, as shown in FIG. 6, housing portion 203 may be anodized by one or more of the following steps in an anodization process 600: a degreasing step 602, a first rinsing step 604 (e.g., with water), a first etching step 606 (e.g., with Alkaline), a first chemical polishing step 608, a second rinsing step 610, a second etching step 612 (e.g., with Satin), a third rinsing step 614, a second chemical polishing step 616, a fourth rinsing step 618, a dyeing step 620 (e.g., with a black dye), a fifth rinsing step 622, a sealing step 624, a sixth rinsing step 626, and a drying step 628. It is to be understood that process 600 of FIG. 6 is purely illustrative, and various other anodization processes may be used in accordance with the invention. It is also to be understood that the steps shown in FIG. 6 are merely illustrative and that steps may be modified, added, or omitted.

Figure 5B:
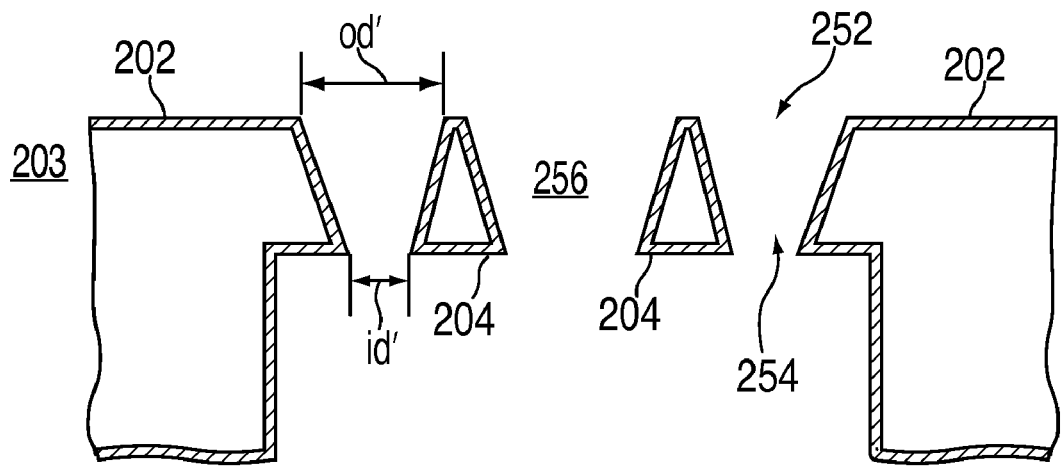
FIG. 5B is a cross-sectional view of the portion of the electronic device of FIG. 5A after a second step in the creation process in accordance with some embodiments of the invention.

By anodizing a housing portion after holes have been formed therethrough, as opposed to anodizing before hole formation, the surfaces about the openings of the holes and the surfaces of the passageways may be cleaned and provided with an anodization layer. For example, as shown in FIG. 5B, once portion 203 of the housing has been anodized, deformations 205 may be minimized or completely removed by the anodization process. Therefore, a drawback of forming the holes through the housing from the cosmetic side (e.g., deformations 205 on the cosmetic side) may be eliminated by anodizing the housing portion after the formation of the holes. Thus, housing portions whose geometries may have previously made laser drilling from the internal side impossible due to size constraints (e.g., a cylindrical housing that could not fit a laser machine therein for forming holes initially through the internal surface) may now have holes formed therethrough from the cosmetic side.

Moreover, by anodizing a housing portion after holes have been formed therethrough, as opposed to anodizing before hole formation, the walls of each hole passageway may be anodized like the inner and outer surfaces of the housing portion. For example, by anodizing portion 203 after holes 250 have been formed therethrough, the walls of passageways 256 may be anodized and may include an anodization layer, for example, like outer surface 202 and inner surface 204. Therefore, the walls of passageways 256 may be of substantially the same color and appearance as the inner and/or outer surfaces, thereby further reducing the visibility of holes 250 to a user.

Anodization of housing portion 203 after the formation of holes 250 may also alter the size of outer openings 252 and inner openings 254. For example, while some steps of the anodization process may increase the size of the openings and passageway of each hole (e.g., degreasing step 602, etching steps 606 and 612, etc.), other steps may decrease the size of the openings and passageway of each hole (e.g., polishing steps 608 and 616, dyeing step 620, etc.). By tweaking the characteristics of the various steps of the anodization process (e.g., process 600), the original geometry of each hole 250 created during formation may be varied during anodization.

For example, as shown in FIG. 5B, the anodization process may change the size of the openings of hole 250 from inner diameter id to inner diameter id' at inner opening 254 and from outer diameter od to outer diameter od' at outer opening 252. In some embodiments, if inner diameter id' after anodization is larger than inner diameter id after formation, then the focal width 285 of laser beam 284 used to form hole 250 prior to anodization may be reduced. This ability to initially drill a smaller hole may help to reduce the cycle time of the machine (e.g., laser 282) forming the holes, thereby improving the number of parts per yield per machine on a given time frame. In other embodiments, if inner diameter id' after anodization is smaller than inner diameter id after formation, then the focal width 285 of laser beam 284 used to form hole 250 prior to anodization may be increased. This ability to initially drill a larger hole may help to reduce the precision or complexity of the machine (e.g., laser 282) forming the holes.

While there have been described apparatus and methods for providing holes through housing components of various electronic devices, it is to be understood that many changes may be made therein without departing from the spirit and scope of the present invention. It is also to be understood that various directional and orientational terms such as "front"

and "back" and "rear," "left" and "right," "top" and "bottom," "side" and "edge" and "corner," "height" and "width" and "depth," "thickness" and "diameter," and the like are used herein only for convenience, and that no fixed or absolute directional or orientational or geometrical limitations are intended by the use of these words. For example, the devices of this invention can have any desired orientation. If reoriented, different directional or orientational terms may need to be used in their description, but that will not alter their fundamental nature as within the scope and spirit of this invention. Those skilled in the art will appreciate that the invention can be practiced by other than the described embodiments, which are presented for purposes of illustration rather than of limitation, and the invention is limited only by the claims which follow.

What is claimed is:

1. A method of forming a housing component for an electronic device, the method comprising:
   providing a piece of material for creating a portion of the housing component;
   forming at least one hole through the piece of material; and then
   anodizing the piece of material, wherein the piece of material provides a cosmetic side and an internal side of the housing component, and wherein the forming comprises forming the at least one hole initially from the cosmetic side, through the piece of material, to the internal side.

2. The method of claim 1, wherein the anodizing increases the size of the at least one hole.

3. The method of claim 1, wherein the anodizing decreases the size of the at least one hole.

4. The method of claim 1, wherein a cross-sectional area of the at least one hole is reduced after the anodizing the piece of material.

5. The method of claim 1, wherein the method further comprises forming a cavity into the internal side where the at least one hole is formed.

6. The method of claim 1, wherein the at least one hole has a first opening comprising a first cross-sectional area and a second opening comprising a second cross-sectional area, and wherein the first cross-sectional area is different from the second cross-sectional area.

7. The method of claim 1, wherein the shape of the housing component is one of hexahedral, spherical, ellipsoidal, conoidal, and octahedral.

8. The method of claim 1, wherein the anodizing the piece of material comprises:
   degreasing the piece of material;
   rinsing the piece of material;
   etching the piece of material;
   polishing the piece of material;
   dyeing the piece of material;
   sealing the piece of material; and
   drying the piece of material.

9. The method of claim 1, wherein the forming the at least one hole comprises at least one of laser drilling, laser cutting, laser machining, laser ablating, electron beam machining, electro-discharge machining, chemical milling, metal injection molding, and conventional drilling.

10. The method of claim 1, wherein the piece of material is a sheet of metal.

11. The method of claim 1, wherein the at least one hole comprises:
    a first opening formed through the cosmetic side of the housing component;
    a second opening formed through the internal side of the housing component; and
    a hollow passageway extending between the first opening and the second opening, wherein:
       the first opening comprises a first cross-sectional area;
       the second opening comprises a second cross-sectional area; and
       the first cross-sectional area is larger than the second cross-sectional area.

12. A method of forming a housing component for an electronic device, the method comprising:
    providing a piece of material, wherein the piece of material comprises an inner surface for creating an internal surface of a portion of the housing component, and wherein the piece of material comprises an outer surface for creating a cosmetic surface of the portion of the housing component;
    forming at least one hole through the piece of material between the inner surface and the outer surface, wherein the forming comprises forming the at least one hole initially from the outer surface, through the piece of material, to the inner surface; and
    anodizing the piece of material, wherein the anodizing changes the size of the at least one hole.

13. The method of claim 12 further comprising positioning an input/output interface component adjacent the inner surface, wherein the at least one hole provides at least one passageway for information to be communicated between the interface component and an environment adjacent the outer surface.

14. The method of claim 12, wherein the anodizing increases the size of the at least one hole.

15. The method of claim 12, wherein the anodizing decreases the size of the at least one hole.

16. The method of claim 12 further comprising forming a cavity into the inner surface at the location where the at least one hole is formed.

17. The method of claim 12, wherein the at least one hole has a first opening comprising a first cross-sectional area and a second opening comprising a second cross-sectional area, and wherein the first cross-sectional area is different from the second cross-sectional area.

18. The method of claim 12, wherein the anodizing the piece of material comprises:
    degreasing the piece of material;
    rinsing the piece of material;
    etching the piece of material;
    polishing the piece of material;
    dyeing the piece of material;
    sealing the piece of material; and
    drying the piece of material.

19. The method of claim 12, wherein the forming the at least one hole comprises at least one of laser drilling, laser cutting, laser machining, laser ablating, electron beam machining, electro-discharge machining, chemical milling, metal injection molding, and conventional drilling.

20. The method of claim 12, wherein the at least one hole comprises:
    a first opening formed through the outer surface;
    a second opening formed through the inner surface; and
    a hollow passageway extending between the first opening and the second opening, wherein:
       the first opening comprises a first cross-sectional area;
       the second opening comprises a second cross-sectional area; and
       the first cross-sectional area is larger than the second cross-sectional area.

* * * * *